US008085268B2

(12) United States Patent
Carrino et al.

(10) Patent No.: US 8,085,268 B2
(45) Date of Patent: Dec. 27, 2011

(54) TECHNIQUES FOR DRAWING GEODETIC POLYGONS

(75) Inventors: John Antonio Carrino, Mountain View, CA (US); Daniel Patrick Cervelli, Menlo Park, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 13 days.

(21) Appl. No.: 12/582,130

(22) Filed: Oct. 20, 2009

(65) Prior Publication Data
US 2011/0090254 A1  Apr. 21, 2011

(51) Int. Cl.
G06T 15/10 (2011.01)
G06T 15/00 (2011.01)

(52) U.S. Cl. ........................... 345/427; 345/419
(58) Field of Classification Search .................. None
See application file for complete search history.

(56) References Cited

U.S. PATENT DOCUMENTS

| | | | |
|---|---|---|---|
| 4,958,305 A * | 9/1990 | Piazza | 345/427 |
| 6,389,289 B1 * | 5/2002 | Voce et al. | 455/456.5 |
| 7,539,666 B2 | 5/2009 | Ashworth et al. | |
| 7,558,677 B2 | 6/2009 | Jones | |
| 7,663,621 B1 * | 2/2010 | Allen et al. | 345/419 |
| 7,872,647 B2 * | 1/2011 | Mayer et al. | 345/420 |
| 2004/0039498 A1 | 2/2004 | Ollis et al. | |
| 2005/0223044 A1 | 10/2005 | Ashworth et al. | |
| 2006/0251307 A1 * | 11/2006 | Florin et al. | 382/128 |
| 2007/0024620 A1 | 2/2007 | Muller-Fischer et al. | |
| 2007/0188516 A1 * | 8/2007 | Loup et al. | 345/606 |
| 2008/0192053 A1 * | 8/2008 | Howell et al. | 345/427 |

FOREIGN PATENT DOCUMENTS

| | | |
|---|---|---|
| EP | 0 763 201 A2 | 3/1997 |
| WO | WO 2005/013200 A1 | 2/2005 |

OTHER PUBLICATIONS

Australian Office Action received in Application No. 2010227081, Applicant: Palantir Technologies, Inc., dated Mar. 18, 2011 (2 pages).
Current Claims of Australian Application No. 2010227081, Applicant: Plantir Technologies, Inc., dated Mar. 2011 (4 pages).
Australian Office Action received in Application No. 2010257305, Applicant: Plantir Technologies, Inc., dated Apr. 12, 2011 (3 pages).

(Continued)

*Primary Examiner* — Daniel Hajnik
(74) *Attorney, Agent, or Firm* — Hickman Palermo Truong & Becker LLP; Adam C. Stone

(57) ABSTRACT

Techniques in a data processor for drawing on a map a geodetic polygon that straddles a splitting meridian include, in one embodiment, maintaining data that represents the geodetic polygon, the data comprising a set of geographic coordinates; transforming the set of geographic coordinates into a set of planar coordinates representing a planar polygon; splitting the planar polygon into a plurality of sub-figures; shifting at least one sub-figure of the plurality of sub-figures along a horizontal axis of two-dimensional plane to produce a shifted sub-figure; and causing the shifted sub-figure to be displayed on a map concurrently with at least one other sub-figure of the plurality of sub-figures that was not shifted.

27 Claims, 12 Drawing Sheets

OTHER PUBLICATIONS

Current Claims of Australian Application No. 2010257305 dated Apr. 2011 (6 pages).

European Patent Office, "European Search Report", Application No. 10195798.3 dated May 17, 2011, 10 pages, Applicant: Palantir Technologies, Inc.

European Current Claims of Application No. 10195798.3, Applicant: Palantir Technologies, Inc., dated May 2011, 5 pages.

Ipbucker, C., "Inverse Transformation for Several Pseudo-cylindrical Map Projections Using Jacobian Matrix" XP019121334 dated Jun. 29, 2009, 12 pages.

Murray, C., Oracle Spatial Developer's Guide—6 Coordinate Systems (Spatial Reference Systems), XP002633543 downloaded from the Internet on Apr. 19, 2001 http://download.oracle.com/docs/cd/828359_01/appdev.111/b28400/sdo_cs_concepts.htm dated Jun. 2009, 61 pages.

* cited by examiner ic Polygons

TECHNIQUES FOR DRAWING GEODETIC POLYGONS

TECHNICAL FIELD

The invention is related to computer-based mapping, and more particularly, to techniques in a data processor for drawing geodetic polygons on a map.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2009 Palantir Technologies, Inc.

BACKGROUND

Geospatial applications are one class of computing applications that computer systems are useful for. A geospatial application generally refers to any computer system that integrates, analyzes, stores, shares, or displays data that is linked to a geographic location.

A geospatial application may include functionality for displaying, on a computer display device, a two-dimensional map of the curved surface of the Earth. The map may be created from aerial photography, satellite imagery, and the like. The geospatial application may create the map using a map projection that projects geographic coordinates (e.g., latitude and longitude) to planar coordinates (e.g., Cartesian coordinates).

One class of map projection is a cylindrical projection. A cylindrical projection forms a rectangular map that typically has lines of latitude and lines of longitude that intersect at right angles and either the lines of latitude or the lines of longitude are equidistant. With some cylindrical projections, a meridian is chosen where the cylindrical projection is split to form the right-most edge and left-most edge of the map. By convention, this "splitting meridian" is often selected as the $180^{th}$ meridian at 180 degrees East longitude (+180° E) and 180 degrees West longitude (−180° W).

In addition to displaying maps, a geospatial application may allow a user to express a geographic feature on the surface of the Earth as a geospatial geometry. One type of geospatial geometry useful for expressing geographic features is a geodetic polygon. A geodetic polygon is a particular area of the Earth's surface. For example, a geodetic polygon may be used to express the perimeter and area of physical geographic features such as lakes, parks, buildings, towns, and the like and conceptual geographic features such as an area of market influence or an area seen by a satellite over a period of time.

A geodetic polygon can be defined that straddles a splitting meridian. In general, a geodetic polygon straddles a splitting meridian if the splitting meridian intersects a geodesic of the geodetic polygon. Drawing a straddling polygon on a cylindrical projection of the Earth is problematic. This is because a cylindrical projection has edges that intersect the straddling polygon along the splitting meridian. One possible approach to drawing a straddling polygon is to require the user to split the straddling polygon into two or more non-straddling geodetic polygons along the splitting meridian. A geospatial application adopting this approach would reject a straddling polygon as straddling a splitting meridian whereupon the user would define two non-straddling geodetic polygons along the splitting meridian as a substitute for the straddling polygon. However, this approach requiring the user to define multiple substitute polygons for a single straddling polygon is awkward and inconvenient. Further, the geodesics of the substitute polygons that run along the splitting meridian will be drawn to indicate the perimeters of the substitute polygons. Thus, the substitute polygons, when drawn on a map, do not visually present an accurate representation of the perimeter and area of the straddling polygon. Still further, certain geospatial queries such as buffering operations may have to be performed multiple times, for example, once for each of the substitute polygons.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
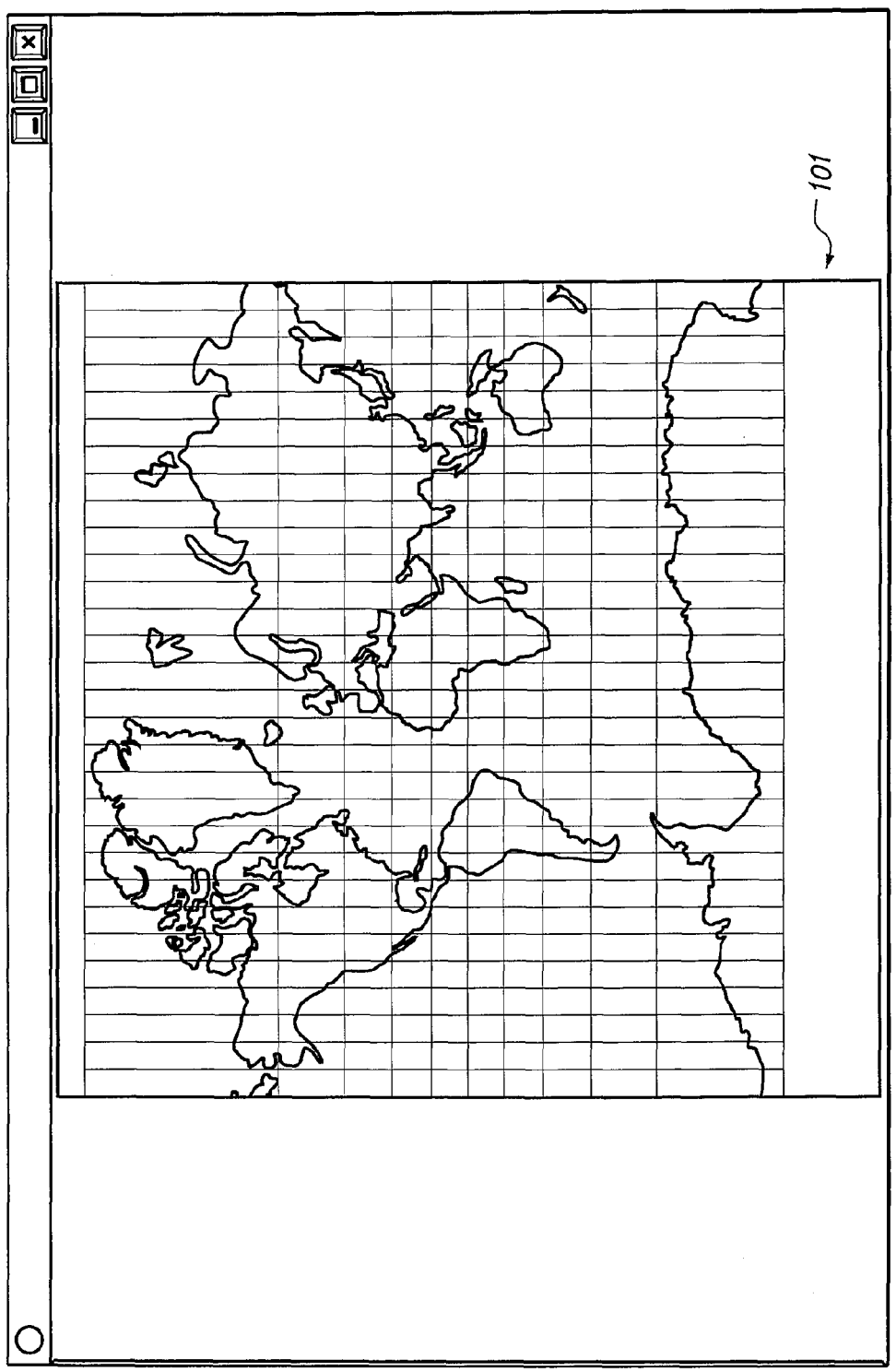
FIG. 1 is a screen shot depicting a map of the Earth created using a Mercator cylindrical projection function.

Techniques in a data processor are disclosed for drawing on a map a geodetic polygon that straddles a splitting meridian. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are disclosed for drawing on a map a geodetic polygon that straddles a splitting meridian. A geodetic polygon that straddles a splitting meridian is referred to herein as a "straddling geodetic polygon" or "straddling polygon". With the techniques, a geospatial application can manage straddling polygons like other non-straddling geodetic polygons. For example, the techniques remove the need to require a user of a geospatial application to define multiple non-straddling geodetic polygons as substitutes for a straddling polygon. Further, the techniques facilitate a more accurate visual representation of the perimeter and area of a straddling polygon when drawn on a map. Further, because the techniques allow a geospatial application to manage a straddling polygon as a whole, the techniques remove the need to formulate multiple geospatial queries as required in circumstances where geospatial applications require straddling polygons be split into multiple substitute geodetic polygons.

According to one embodiment, the techniques are implemented by a geodetic polygon drawing computer system. The drawing system maintains data that represents the vertices of a geodetic polygon. For example, the drawing system may receive a set of geographic coordinates through a user-driven input process and store the coordinates in a database. The set of coordinates may be such that the geodetic polygon defined by the geographic coordinates straddles a splitting meridian.

According to the embodiment, the drawing system transforms the set of geographic coordinates into a set of planar coordinates. The planar coordinates correspond to vertices of a projected planar polygon that represents the geodetic polygon in a two-dimensional projected space. A model of the curved surface of the Earth may also be projected as a map into the projected space using a cylindrical projection function. The drawing system models the projected space as a set of horizontally arranged contiguous mapping planes each having a horizontal extent along a horizontal axis of the projected space that is equal in length to the horizontal extent of the map along the horizontal axis. One mapping plane serves as the origin mapping frame. In the projected space, segments of the projected planar polygon that cross the right-most or left-most vertical boundary of a mapping plane represent geodesics of the geodetic polygon that cross the splitting meridian.

According to the embodiment, to transform the set of geographic coordinates to the set of planar coordinates, the drawing system proceeds in a counter-clockwise order through the set of geographic coordinates with respect to a selected reference geographic coordinate. The reference geographic coordinate is transformed to a reference planar coordinate in the projected space using the cylindrical projection function. The geographic coordinate immediately adjacent to the reference geographic coordinate moving counter-clockwise along the perimeter of the geodetic polygon is also transformed to a planar coordinate in the projected space. In another embodiment, the adjacent geographic coordinate is found by moving clockwise as opposed to counter-clockwise along the perimeter of the geodetic polygon.

According to the embodiment, the drawing system then calculates the distance along the horizontal axis between the reference planar coordinate and the adjacent planar coordinate. If the calculated distance is greater than one-half the horizontal extent of the map along the horizontal axis, then the mapping system determines that the reference geographic coordinate and the adjacent geographic coordinate lie on opposite sides of the splitting meridian.

According to the embodiment, upon determining that that the reference geographic coordinate and the adjacent geographic coordinate lie on opposite sides of the splitting meridian, the drawing system constructs the projected planar polygon in the projected space by adjusting the position of the adjacent planar coordinate along the horizontal axis such that the distance along the horizontal axis between the reference planar coordinate and the adjusted adjacent planar coordinate corresponds to a longitudinal angle of the geodetic polygon between the reference geographic coordinate and the adjacent geographic coordinate. This results in a projected planar polygon a portion of which lies outside the right-most boundary and/or the left-most boundary of the map in the projected space. As explained in greater detail hereinafter, the drawing system constructs the remainder of the projected planar polygon in similar fashion setting the reference geographic coordinate to be the adjacent geographic coordinate and setting the reference planar coordinate to be the adjacent planar coordinate and proceeding along the perimeter of the geodetic polygon in counter-clockwise (or clockwise) order until all geographic coordinates in the set are processed.

According to the embodiment, once the projected planar polygon is constructed, the drawing system divides the projected planar polygon along the vertical boundaries of the mapping planes to produce a plurality of sub-figures comprising the projected planar polygon. The drawing system then shifts sub-figures along the horizontal axis into the origin mapping plane so that all sub-figures comprising the planar polygon are positioned within the boundaries of the origin mapping plane. The drawing system then causes the map to be displayed on a computer display along with the sub-figures as positioned by the drawing system within the origin mapping plane.

Cylindrical Projections and Straddling Geodetic Polygons

As an example of a type of cylindrical projection, FIG. 1 is a screen shot of a map 101 of the Earth created using a Mercator cylindrical projection. One consequence of creating a map using a cylindrical projection is that a meridian may be chosen where the cylindrical projection is split to form the right-most edge and left-most edge of the map. By convention, this "splitting meridian" is often selected as the $180^{th}$ meridian at 180 degrees East longitude (+180° E) and 180 degrees West longitude (−180° W). As an example, the splitting meridian of the Mercator projection of FIG. 1 is the $180^{th}$ meridian. However, a meridian other than the $180^{th}$ meridian may be selected as the splitting meridian.

A geodetic polygon can be defined that straddles a splitting meridian. In general, a geodetic polygon straddles a splitting meridian if the splitting meridian intersects a geodesic of the geodetic polygon. For example, the geodetic polygon with the following set of ordered vertices ((+160° E, +60° N), (+160° E, +20° N), (−160° W, +20° N), (−160° W, +60° N)) crosses the $180^{th}$ meridian twice. Once between vertex (+160° E, +20° N) and vertex (−160° W, +20° N) and a second time between vertex (−160° W, +60° N) and vertex (+160° E, +60° N). For ease of explanation, a geodetic polygon that straddles a splitting meridian is referred to hereinafter as a "straddling geodetic polygon" or "straddling polygon".

Figure 2:
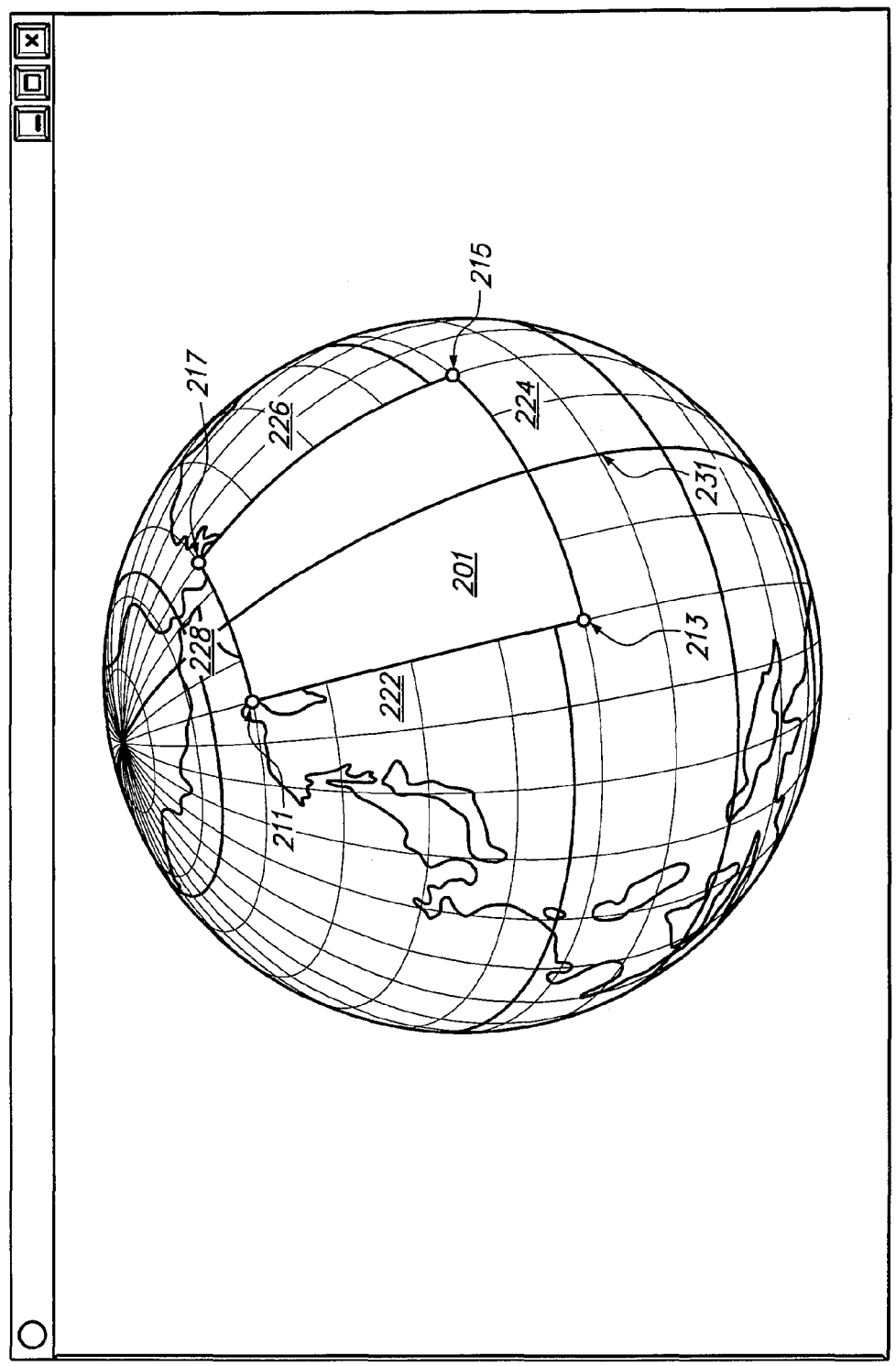
FIG. 2 is a screen shot depicting the Earth as a globe and showing the perimeter and area of an example geodetic polygon.

As an example of a straddling geodetic polygon, FIG. 2 is a screen shot depicting the Earth as a globe and showing the perimeter and area of an example straddling polygon 201 that straddles the $180^{th}$ meridian 231. The example straddling polygon comprises four vertices 211, 213, 215, and 217 and four geodesics 222, 224, 226, and 228 connecting the vertices. As shown in FIG. 2, geodesic 224 crosses meridian 231 between vertices 213 and 215 and geodesic 228 crosses meridian 231 between vertices 217 and 211.

Drawing a straddling polygon on a cylindrical projection of the Earth is problematic. This is because a cylindrical projection has edges that intersect the straddling polygon along the splitting meridian. One possible approach to drawing a straddling polygon is to require the user to split the straddling polygon into two or more non-straddling geodetic polygons along the splitting meridian. A geospatial application adopting this approach would reject a straddling polygon as straddling a splitting meridian whereupon the user would define two non-straddling geodetic polygons along the splitting meridian as a substitute for the straddling polygon. For example, the user could split the example straddling polygon 201 into one geodetic polygon entirely on one side of the $180^{th}$ meridian ((+160° E, +60° N), (+160° E, +20° N), (+180° E, +20° N), (+180° E, +60° N)) and another geodetic polygon entirely on the other side of the $180^{th}$ meridian ((−180° W, +60° N), (−180° W, +20° N), (−160° W, +20° N), (−160° W, +60° N)).

Requiring the user to define multiple substitute polygons for a single straddling polygon is awkward and inconvenient. The geodesics of the substitute polygons that run along the splitting meridian will be drawn to indicate the perimeters of the substitute polygons. Thus, the substitute polygons, when drawn on a map, do not visually present an accurate representation of the perimeter and area of the straddling polygon. Still further, certain geospatial queries such as buffering operations may have to be performed multiple times, for example, once for each of the substitute polygons.

Structural Overview

Figure 3:
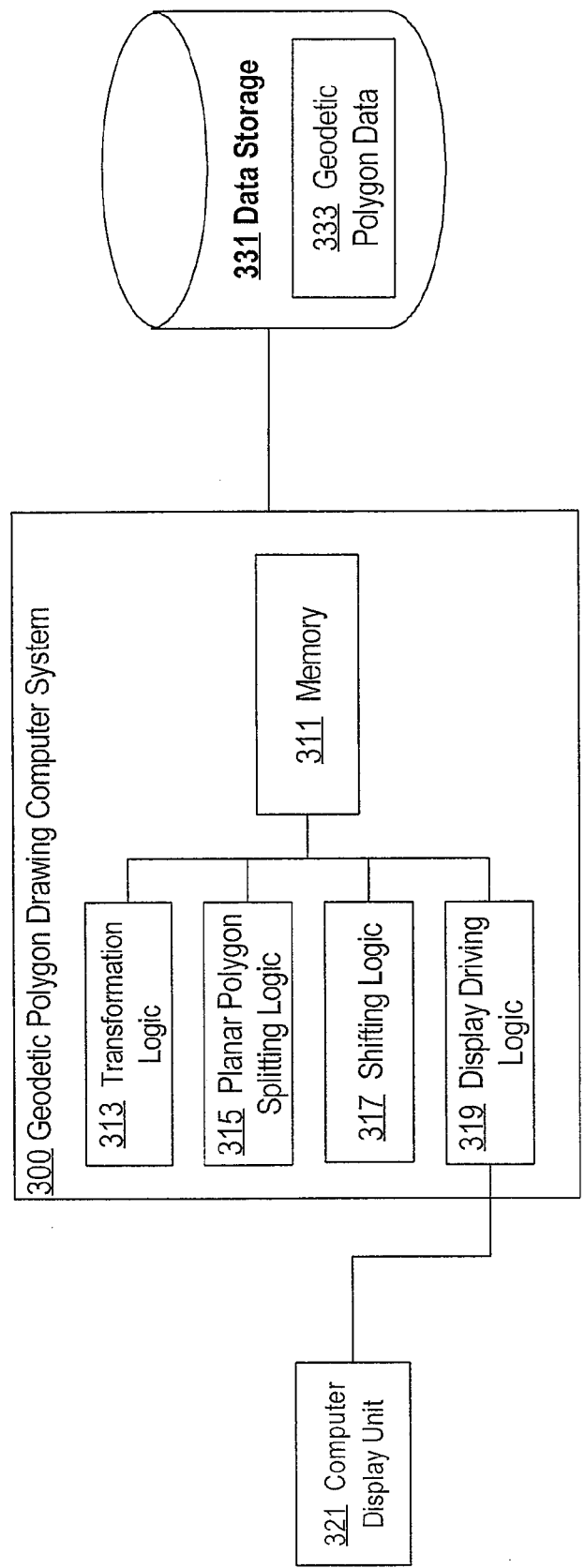
FIG. 3 is a block diagram illustrating a geodetic polygon drawing computer system.

Techniques for drawing a straddling polygon on a map may be embodied in virtually any type of computer system including a computer system such as geodetic polygon drawing computer system 300 of FIG. 3. Drawing system 300 comprises memory 311, transformation logic 313, planar polygon splitting logic 315, shifting logic 317, and display driving logic 319. A computer display unit 321 may be coupled to display driving logic 319. Drawing system 300 may also be coupled to data storage 331 storing geodetic polygon data 333.

Figure 11:
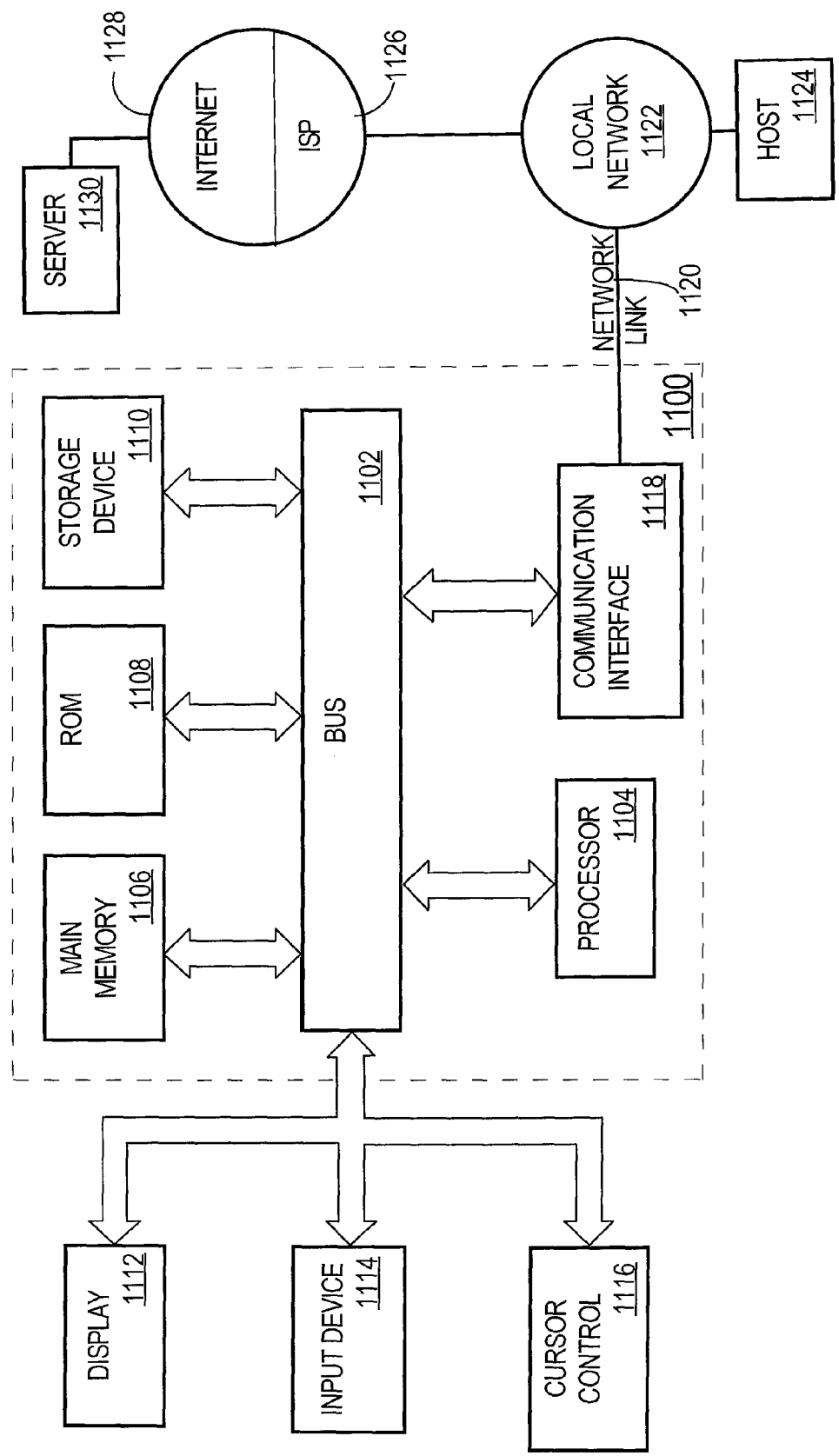
FIG. 11 is a block diagram illustrating a computer system with which an embodiment of the invention may be implemented.

In one embodiment, drawing system 300, display unit 321, and data storage 331 may be implemented by the same computer system such as the computer system 1100 of FIG. 11. Alternatively, drawing system 300, display unit 321, and data storage 331 may be implemented by a plurality of computer systems arranged in any convenient manner such as a two-tier client/server architecture or a three-tier architecture comprising, for example, a client tier including display unit 321, an application tier including drawing system 300, and a database tier including data storage 331.

Geodetic polygon data 333 is any data that represents a geodetic polygon and that comprises an ordered set of geographic coordinates identifying vertices of the geodetic polygon. The geographic coordinates may be specified using virtually any geographic coordinate system suitable for identifying locations on the Earth. In one embodiment, geographic coordinates are expressed in terms of latitude and longitude with reference to a World Geodetic System reference datum such as the WGS 84 datum. However, expression of geographic coordinates is not limited to latitude and longitude and other geographic coordinate systems may be used such as the Universal Transversal Mercator (UTM) coordinate system or the Military Grid Reference System (MGRS) coordinate system.

The geographic coordinates comprising data 333 may be provided to drawing system 300 in virtually in manner suitable for providing data to a computer system such as by a user through a user interface such as, for example, a command line interface or a graphical user interface or by a computing process through a configuration file, a middleware messaging layer, a programmatic interface such as an Application Programming Interface (API), a remote procedure call, and the like.

The order of the geographic coordinates in the set of geographic coordinates determines the perimeter of the geodetic polygon and determines which geographic coordinates in the set are adjacent along the perimeter. The perimeter of the geodesic polygon is defined by geodesics connecting adjacent vertices. Each geodesic of the geodetic polygon between adjacent vertices runs along the shortest possible arc on the surface of a reference ellipsoid used by drawing system 300 to model the Earth. In one embodiment, in which drawing system 300 models the Earth as a sphere, each geodesic between adjacent vertices runs along the shortest possible great circle arc between the vertices.

As an example, the set of ordered geographic coordinates ((+160° E, +60° N), (+160° E, +20° N), (−160° W, +20° N), (−160° W, +60° N)) define an area of a geodetic polygon that spans 40 degrees longitudinally and that straddles the $180^{th}$ meridian as opposed to an area of a geodetic polygon that spans 340 degrees longitudinally and that wraps almost entirely around the world.

Memory 311 is configured to store data 333 representing a geodetic polygon and comprising an ordered set of geographic coordinates. In one embodiment, drawing system 300 reads data 333 from data storage 331 and stores data 333 in memory 311 in response to a request to draw the geodetic polygon represented by data 333 on a map such as, for example, a map of the entire Earth's surface. In general, the map may be any two-dimensional (planar) visual representation of an area of a curved surface created using a cylindrical map projection.

In general, a cylindrical projection function takes as input a geographic coordinate and produces as output a coordinate in a planar coordinate space (planar coordinate). Non-limiting examples of suitable cylindrical map projection functions include a Mercator cylindrical projection function, a transverse Mercator projection function, a Miller projection function, an equidistant cylindrical projection, and a cylindrical equal-area projection function.

Data comprising the map may be stored in memory 311 as well as data storage 331. Such data may include aerial photographic imagery, satellite imagery, computer graphics, or other data suitable for creating a map on computer display unit 321 with the aid of display driving logic 319.

Transformation logic 313 is coupled to memory 311 and configured to transform a state of memory 311 by transforming a set of geographic coordinates representing a geodetic polygon into a set of planar coordinates representing a projected planar polygon. Techniques for accomplishing this transformation are described in greater detail elsewhere in this specification.

Planar polygon splitting logic 315 is coupled to transformation logic 313 and memory 311 and configured to further transform the state of memory 311 by dividing a projected planar polygon into a plurality of sub-figures. Techniques for dividing a planar polygon into a plurality of sub-figures are described in greater detail elsewhere in this specification.

Shifting logic 317 is coupled to planar polygon splitting logic 315 and memory 311 and configured to further transform the state of memory 311 by shifting at least one sub-figure of the plurality of sub-figures along a horizontal axis of a two-dimensional plane to produce a shifted sub-figure. Techniques for shifting a sub-figure are described in greater detail elsewhere in this specification.

Display driving logic 319 is configured to cause display on computer display unit 321 the shifted sub-figure on a map concurrently with at least one other sub-figure of the plurality of sub-figures. Computer display unit 321 may be virtually any computer monitor or display such as, for example, a Liquid Crystal Display (LCD) or Cathode Ray Tube (CRT). Display unit 321 may be a component of drawing system 300. Alternatively, display unit 321 may be a component of a separate computer system (not shown) coupled to drawing system 300 through a communication mechanism such as a data network. For example, display unit 321 may be a component of a desktop computer system or a mobile computing device such as a cell-phone, a personal data assistant (PDA), or a Global Positioning Satellite (GPS) receiver communicatively coupled to drawing system 300 through a data network such as the Internet, a wireless network, a Local Area Network (LAN), a Wide Area Network (WAN), and the like.

Method for Drawing a Geodetic Polygon on a Map

Figure 4:
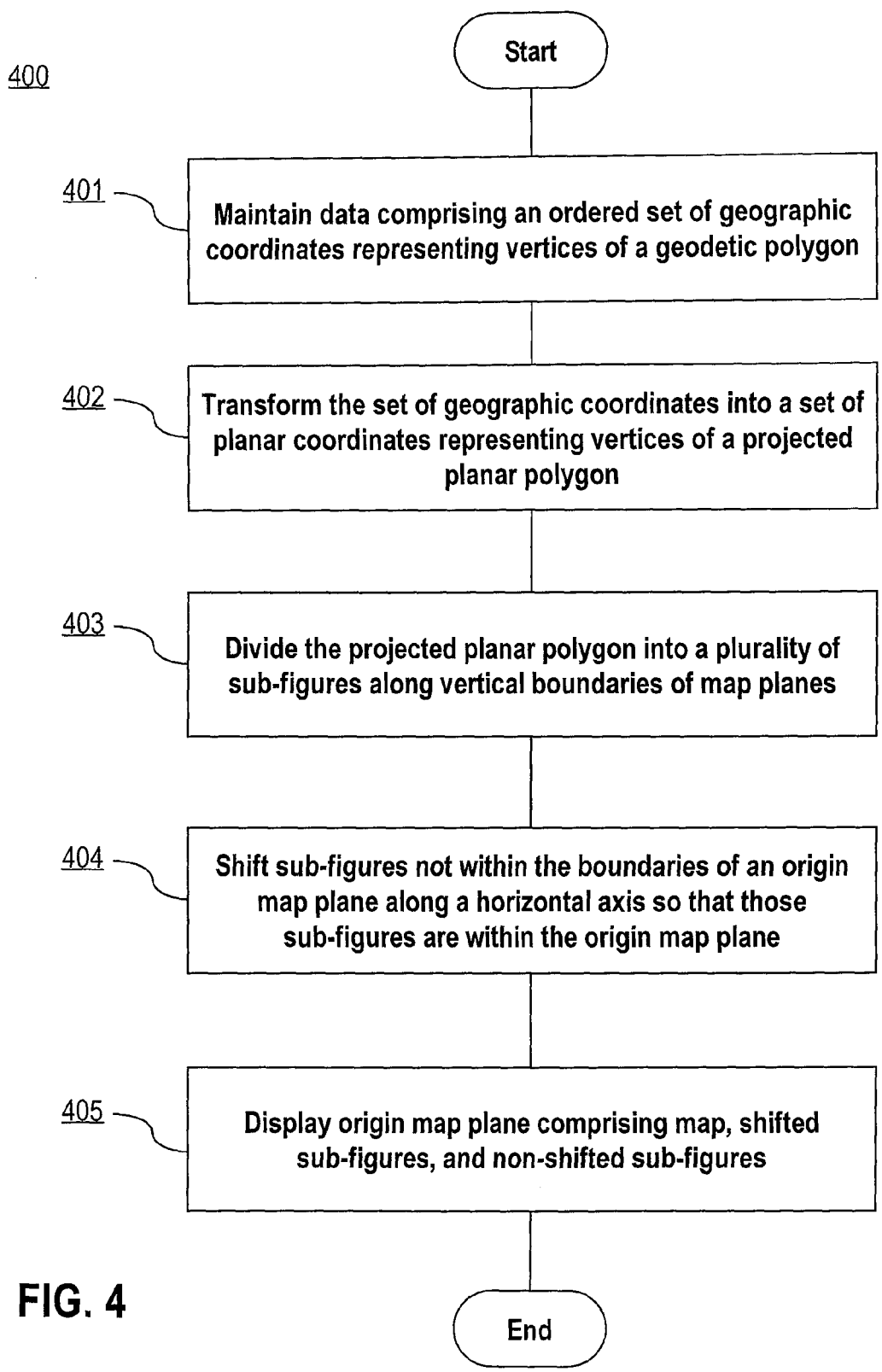
FIG. 4 is a flowchart illustrating a high level overview of a method for drawing a geodetic polygon on a map.

FIG. 4 is a flowchart illustrating a high level overview of a method 400 for drawing a geodetic polygon on a map. Method 400 is explained by example with reference to the example drawing system 300 of FIG. 3 and the example geodetic polygon 201 of FIG. 2. However, method 400 may be implemented by other computer systems and computing devices. Further, method 400 may be used to draw geodetic polygons on a map other than geodetic polygon 201.

At step 401, data is maintained representing a geodetic polygon and comprising an ordered set of geographic coordinates corresponding to vertices of the geodetic polygon. As explained previously, the order of the geographic coordinates in the set specifies the perimeter of the geodetic polygon and specifies which vertices are adjacent to each other along the perimeter.

For example, drawing system 300 may maintain in memory 311 data comprising an ordered set of geographic coordinates representing the vertices of the geodetic polygon 201. Geodetic polygon 201 comprises four vertices 211, 213, 215, and 217 corresponding to geographic coordinates (+160° E, +60° N), (+160° E, +20° N), (−160° W, +20° N), and (−160° W, +60° N) respectively. Vertices 211 and 213 are adjacent, as are vertices 213 and 215, as are vertices 215 and 217, and as are vertices 217 and 211. Geodetic polygon 201 further comprises four geodesics 222, 224, 226, and 228 that connect the vertices and define the perimeter of geodetic polygon 201.

Transforming Geographic Coordinates to Planar Coordinates

At step 402, the set of geographic coordinates representing the vertices of a geodetic polygon is transformed into a set of planar coordinates representing the vertices of a projected planar polygon. Step 402 is explained in greater detail below with reference to FIG. 6.

The projected planar polygon represents the geodetic polygon in a two-dimensional plane (projected space). In one embodiment, the projected space includes a map of the Earth, the map having been projected into the projected space using a cylindrical projection function.

Figure 5:
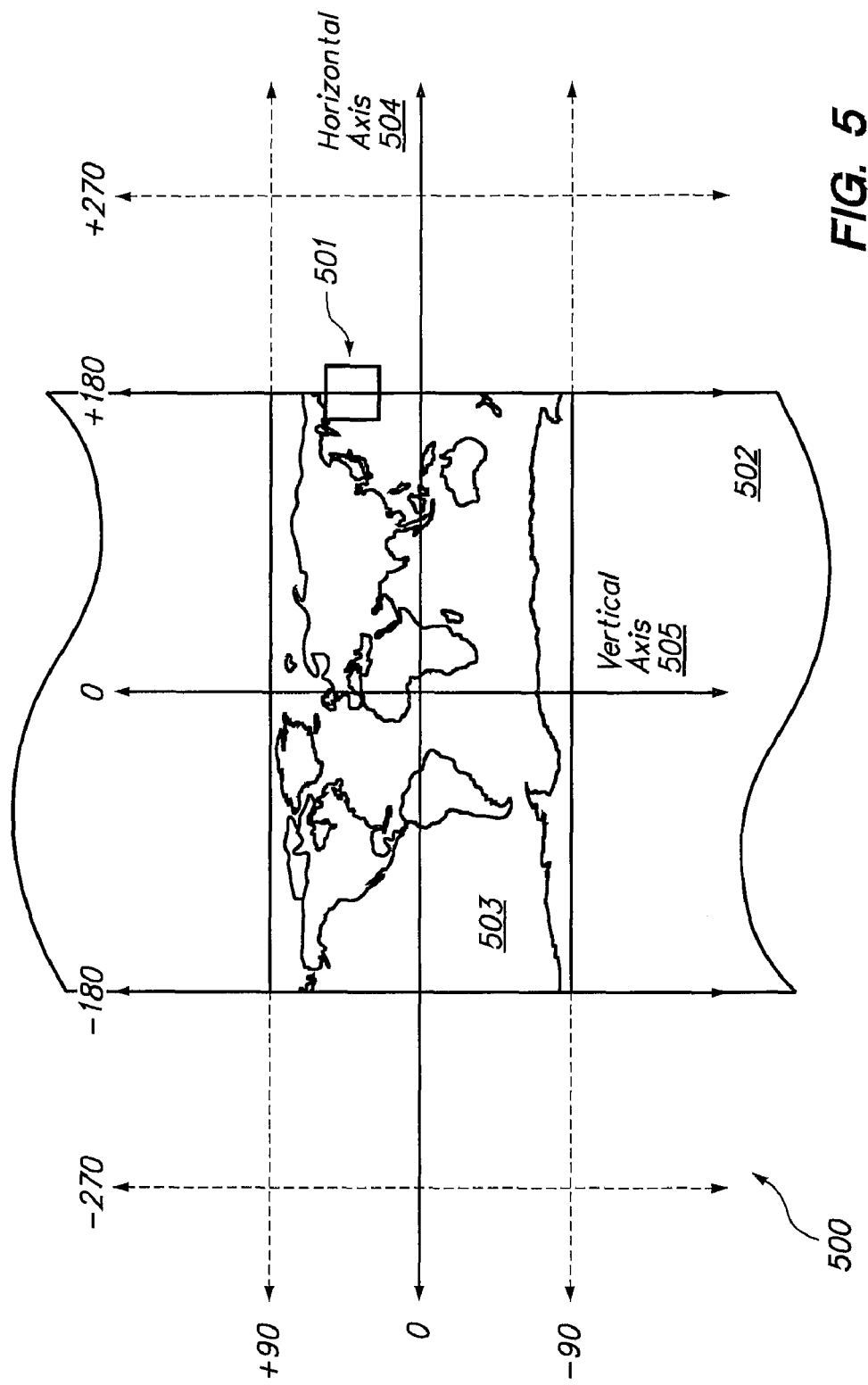
FIG. 5 is a block diagram illustrating a projected space.

As an example of a projected space, FIG. 5 illustrates projected space 500 comprising an equidistant cylindrical map projection of the Earth 503 and projected planar polygon 501 calculated by transforming an ordered set of geographic coordinates comprising geodetic polygon 201 into an ordered set of planar coordinates. The two-dimensional coordinate system of projected space 500 is based on the cylindrical projection function used by drawing system 300 to create map projection 503. In the example projected space 500, an equidistant cylindrical projection function is used to create map projection 503. In an equidistant cylindrical projection, the center of the projection is at planar coordinate (0, 0), meridians are mapped to equally-spaced vertical lines and circles of latitude are mapped to evenly spread horizontal lines.

For ease of explanation, an equidistant cylindrical projection is presented in FIG. 5 as an equidistant cylindrical projection function maps geographic coordinates (e.g., latitude/longitude) directly to planar coordinates. For example, an equidistant cylindrical projection function would project the geographic coordinate (+160° E, +60° N) into the planar coordinate (160, 60). However, other cylindrical projections may be used with method 400 and method 400 is not limited to any particular type of cylindrical projection or cylindrical projection function.

Returning to step 402, FIG. 6 is a flow chart illustrating steps of a sub-method implementing step 402 of method 400 for transforming an ordered set of geographic coordinates representing the vertices of a geodetic polygon into an ordered set of planar coordinates representing the vertices of a projected planar polygon according to an embodiment of the invention.

Figure 6A:
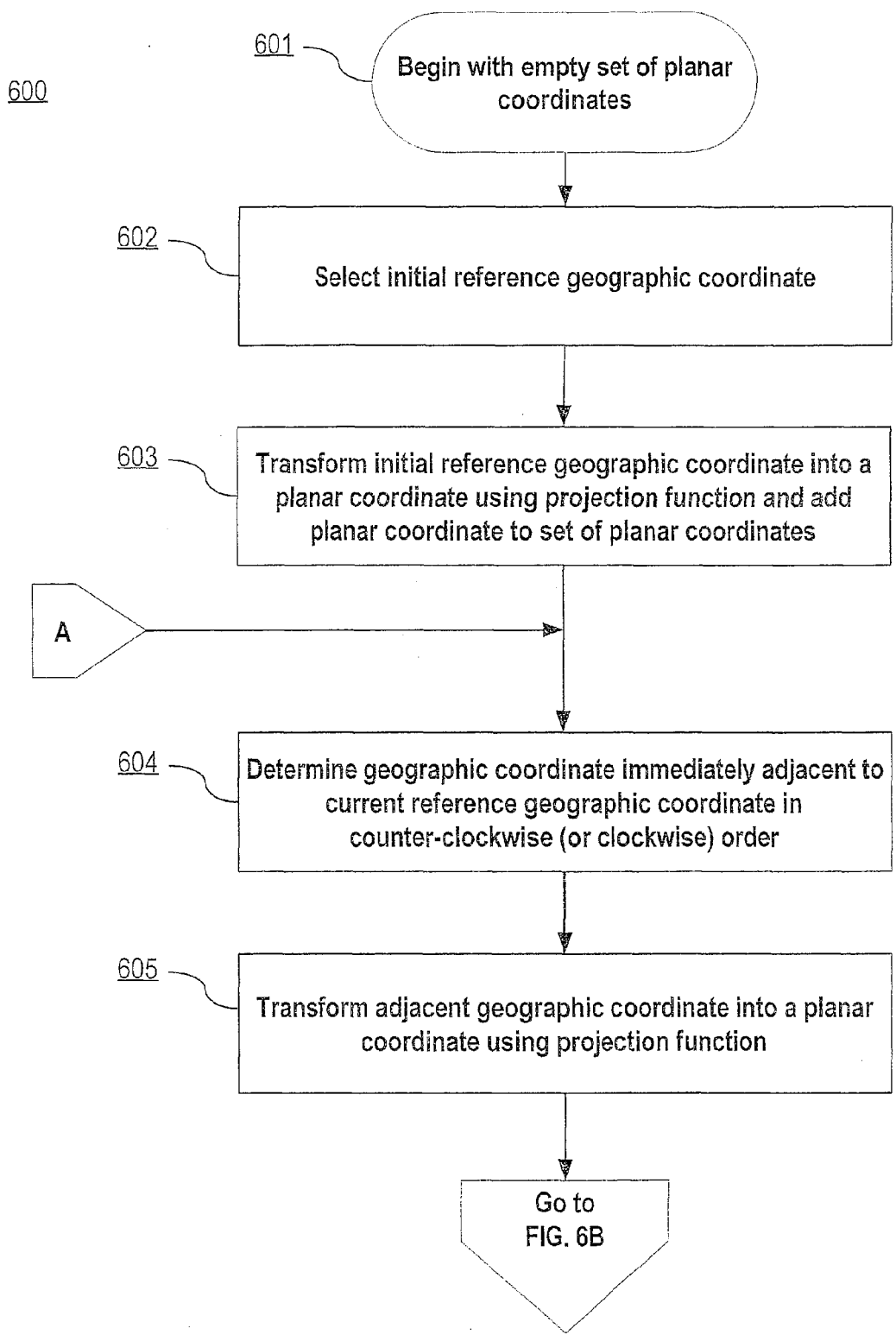
FIG. 6A and FIG. 6B illustrate a high level overview of a sub-method of a method for drawing a geodetic polygon on a map.
Figure 6B:
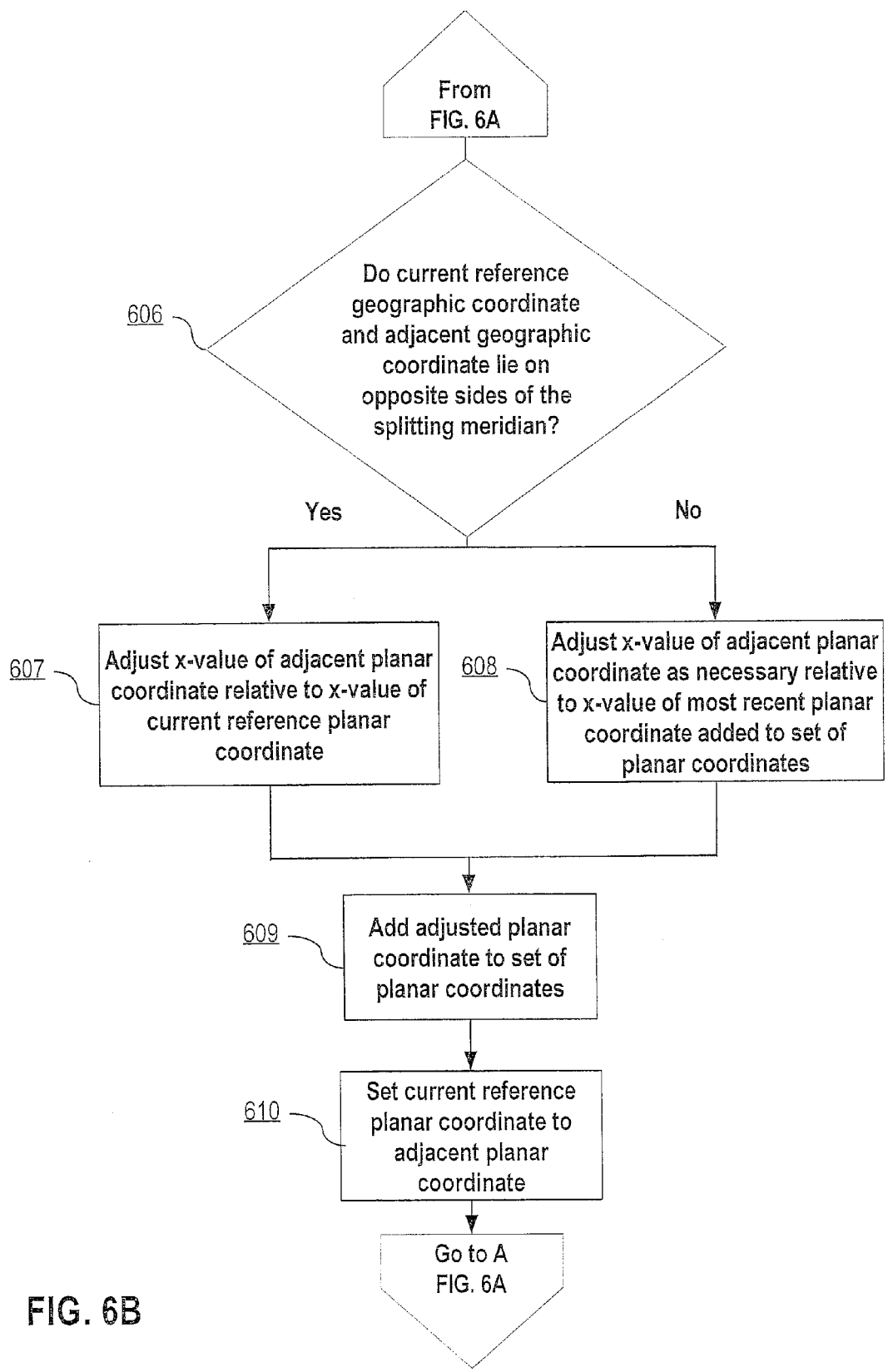

According to the embodiment depicted in FIG. 6, to transform the set of geographic coordinates to the set of planar coordinates, geographic coordinates in the set are visited in counter-clockwise order along the perimeter of the geodetic polygon starting from a selected reference geographic coordinate. In another embodiment, geographic coordinates in the set are visited in clockwise order. Thus, transformation of the set of geographic coordinates to the set of planar coordinates may be accomplished by visiting geographic coordinates in either clockwise or counter-clockwise order along the perimeter of the geodetic polygon. For ease of explanation, sub-method 600 is explained according to an embodiment that visits geographic coordinates in counter-clockwise order. However, in other embodiments, geographic coordinates may be visited in clockwise order to accomplish the same.

Sub-method begins at step 601 with an empty set of planar coordinates. At step 602, an initial reference geographic coordinate is selected. The initial reference geographic coordinate may be selected arbitrarily from the set of geographic coordinates representing the geodetic polygon. For example, assume vertex 213 of geodetic polygon 201 having geographic coordinate (+160° E, +20° N) is selected as the initial reference geographic coordinate.

At step 603, the initial reference geographic coordinate is transformed into a planar coordinate in the projected space to produce a current reference planar coordinate. The current reference planar coordinate is then added to the empty set of planar coordinates. In one embodiment, the selected initial reference geographic coordinate is transformed into the current reference planar coordinate using the cylindrical projection function used to project the surface of the Earth into the projected space (i.e., using the cylindrical projection function used to create the map on which the geodetic polygon will be drawn). For example, since map 503 was created using an equidistant cylindrical projection function, the equidistant cylindrical projection function may be used to transform initial reference geographic coordinate (+160° E, +20° N) into current reference planar coordinate (160, 20). This produces a planar coordinate having an x-value along the horizontal axis 504 of projected space 500 of 160 and a y-value along the vertical axis 505 of 20.

At step 604, the geographic coordinate in the set of geographic coordinates immediately adjacent to the current reference geographic coordinate in counter-clockwise (or clockwise) order along the perimeter of geodetic polygon is determined. For example, in the set of geographic coordinates comprising the vertices of geodetic polygon 201, geographic coordinate (−160° W, +20° N) corresponding to vertex 215 is the geographic coordinate immediately adjacent to current reference geographic coordinate (+160° E, +20° N) in counter-clockwise order along the perimeter of geodetic polygon 201.

At step 605, the adjacent geographic coordinate determined in step 604 is transformed, using the cylindrical projection function, into a planar coordinate in the projected space to produce an adjacent planar coordinate. For example, the equidistant cylindrical projection function may be used to transform adjacent geographic coordinate (−160° W, +20° N) into adjacent planar coordinate (−160, 20).

At step 606, a determination is made whether the current reference geographic coordinate and the adjacent geographic coordinate lie on opposite sites of the splitting meridian. In one embodiment, this determination is made by calculating the distance along the horizontal axis of the projected space between the current reference planar coordinate and the adjacent planar coordinate and determining whether that distance is greater than one-half the distance along the horizontal axis of the map in the projected space. For example, the current reference geographic coordinate (+160° E, +20° N) and the adjacent geographic coordinate (−160° W, +20° N) would be determined to lie on opposite side of the splitting meridian because the distance along the horizontal axis in projected space 500 between current reference planar coordinate (160, 20) and adjacent planar coordinate (−160, 20) is 320 which is greater than one-half the distance of the horizontal extent of the map 503 in the projected space 500 which is 360 divided by 2 or 180.

If, at step 606, it is determined that the current reference geographic coordinate and the adjacent geographic coordinate lie on opposite sides of the splitting meridian, then in step 607 the adjacent planar coordinate determined in step 605 is adjusted along the horizontal axis of the projected space to produce an adjusted planar coordinate such that the distance along the horizontal axis between the current reference planar coordinate and the adjusted planar coordinate corresponds, according to the cylindrical projection, to the longitudinal angle of the geodetic polygon between the current reference geographic coordinate and the adjacent geographic coordinate.

In one embodiment of step 607, the x-value of the adjusted planar coordinate in the projected space is calculated relative to the x-value of the current reference planar coordinate in the projected space and the y-value of the adjusted planar coordinate in the projected space is same as the y-value of the adjacent planar coordinate in the projected space. In one embodiment of step 607, the amount of adjustment (adjustment offset) relative to the x-value of the current reference planar coordinate is calculated by subtracting the distance along the horizontal axis of the projected space between the current reference planar coordinate and the adjacent planar coordinate from the horizontal extent of the map along the horizontal axis.

The adjustment process of step 607 is perhaps best explained with an example. Continuing the example above involving geodetic polygon 201, it was determined in step 606 that current reference geographic coordinate (+160° E, +20° N) and adjacent geographic coordinate (−160° W, +20° N) lie on opposite sides of the splitting meridian. Accordingly, at step 607, the adjacent planar coordinate (−160, 20) is adjusted to produce an adjusted planar coordinate so that the distance along horizontal axis 504 between current reference planar coordinate (160, 20) and the adjusted planar coordinate corresponds, according to the equidistant cylindrical projection 503 and geodetic polygon 201, to the longitudinal angle of 40° between current reference geographic coordinate (+160° E, +20° N) and adjacent geographic coordinate (−160° W, +20° N). Note that the distance along horizontal axis 504 between current reference planar coordinate (160, 20) and adjacent planar coordinate (−160, 20) is 320 and does not correspond, according to the equidistant cylindrical projection 503 and geodetic polygon 201, to the longitudinal angle of 40° between geographic coordinates (+160° E, +20° N) and (−160° W, +20° N). Continuing the example, the adjustment offset is calculated by subtracting the distance along horizontal axis 504 between current reference planar coordinate (160, 20) and adjacent planar coordinate (−160, 20) which is 320 from the horizontal extent of the map 503 which is 360 to produce an adjustment offset of 40 (360−320=40). To calculate the x-value of the adjusted planar coordinate, the adjustment offset of 40 is added to the x-value of the reference planar coordinate 160 to give an x-value for the adjusted planar coordinate of 200. The y-value of the adjusted planar coordinate becomes the y-value of the adjacent planar coordinate giving an adjusted planar coordinate having an x-value of 200 and y-value of 20. Note that the distance along horizontal axis 504 between current reference planar coordinate (160, 20) and adjusted planar coordinate (200, 20) is 40 which corresponds, according to the equidistant cylindrical projection 503 and geodetic polygon 201, to the longitudinal angle of 40° between current reference geographic coordinate (+160° E, +20° N) and adjacent geographic coordinate (−160° W, +20° N).

After completion of step 607, at step 609, the adjusted planar coordinate is added in order to the set of planar coordinates. In one embodiment, the set of planar coordinates is implemented as a linked list data structure or similar data structure and planar coordinates are added to the end of the list. Continuing the example involving geodetic polygon 201, after adjusted planar coordinate (200, 20) is calculated in step 607 and added in order to the set of planar coordinates in step 609, the set of planar coordinates comprises current reference planar coordinate (160, 20) followed in order by adjusted planar coordinate (200, 20).

If, on the other hand, at step 606, it is determined that the current reference geographic coordinate and the adjacent geographic coordinate do not lie on opposite sides of the splitting meridian, then in step 608 the adjacent planar coordinate is adjusted as necessary along the horizontal axis of the projected space relative to the planar coordinate most recently added to the set of planar coordinates.

In one embodiment of step 608, the x-value of the adjusted planar coordinate in the projected space is calculated relative to the x-value of the most recent planar coordinate added to the set of planar coordinates taking into account the difference along the horizontal axis of the projected space between the current reference planar coordinate and the adjacent planar coordinate. The y-value of the adjusted planar coordinate calculated in step 608 is set to be the same as the y-value of the adjacent planar coordinate.

For example, assume that in step 602 geographic coordinate (+160° E, +60° N) of geodetic polygon 201 is selected as the initial reference geographic coordinate. After completion of step 603, the set of planar coordinates would consist of one planar coordinate, planar coordinate (160, 60). At step 606, it would be determined that current reference geographic coordinate (+160° E, +60° N) and adjacent geographic coordinate (+160° E, +20° N) do not lie on opposite sides of the splitting meridian because the distance along the horizontal axis between the current reference planar coordinate and the adjacent planar coordinate is 0 which is not greater than one-half the horizontal extent of map 503 in projected space 500. Therefore, in step 608 an adjusted planar coordinate would be calculated for adjacent planar coordinate (160, 20). The x-value of the adjusted planar coordinate would be relative to the x-value of planar coordinate most recently added to the set of planar coordinates or x-value 160 from planar coordinate (160, 60). The x-value of the adjusted planar coordinate takes into account the difference between the current reference planar coordinate and the adjacent planar coordinate which in this example is 0. Accordingly, the adjusted planar coordinate calculated at step 608 would be (160, 20). After completion of step 608, at step 609, the adjusted planar coordinate calculated in step 608 is added in order to the set of planar coordinates giving a set of planar coordinates consisting of planar coordinate (160, 60) followed in order by planar coordinate (160, 20).

At step 610, the current reference geographic coordinate is set to be the adjacent geographic coordinate determined in step 604 and the current planar coordinate is set to be the adjacent planar coordinate calculated in step 605. After completion of step 610, sub-method 600 returns to step 604 to process the next geographic coordinate in the set of geographic coordinates in counter-clockwise (or clockwise) order relative to the new current reference geographic coordinate. Steps 604 through 609 are repeated for each remaining geographic coordinate in the set of geographic coordinates until all geographic coordinates in the set are accounted for.

As a result of sub-method 600, an ordered set of planar coordinates representing the vertices of a projected planar polygon is produced from an ordered set of geographic coordinates representing a geodetic polygon. The order of planar coordinates in the set of planar coordinates indicates the perimeter of the projected planar polygon and indicates which vertices of the projected planar polygon are adjacent to each other.

As an example, sub-method 600, when operating on a set of geographic coordinates representing geodetic polygon 201 of FIG. 2, may produce the ordered set of planar coordinates ((160, 20), (200, 20), (200, 60), (160, 60)) comprising projected planar polygon 501 as shown in FIG. 5. Projected planar polygon 501 in projected space 500 is shown in greater detail in FIG. 7 (map not shown). Projected planar polygon 501 has vertices 713, 715, 717, and 711 corresponding to planar coordinates ((160, 20), (200, 20), (200, 60), (160, 60)) respectively. Vertices 713, 715, 717, and 711 of projected planar polygon 501 correspond to vertices 213, 215, 217, and 211 of geodetic polygon 201 respectively. Projected planar polygon 501 has segments 722, 724, 726, and 728 connecting vertices 713, 715, 717, and 719. Segments 722, 724, 726, and 728 correspond to geodesics 22, 224, 226, and 228 of geodetic polygon 201 respectively.

Figure 7:
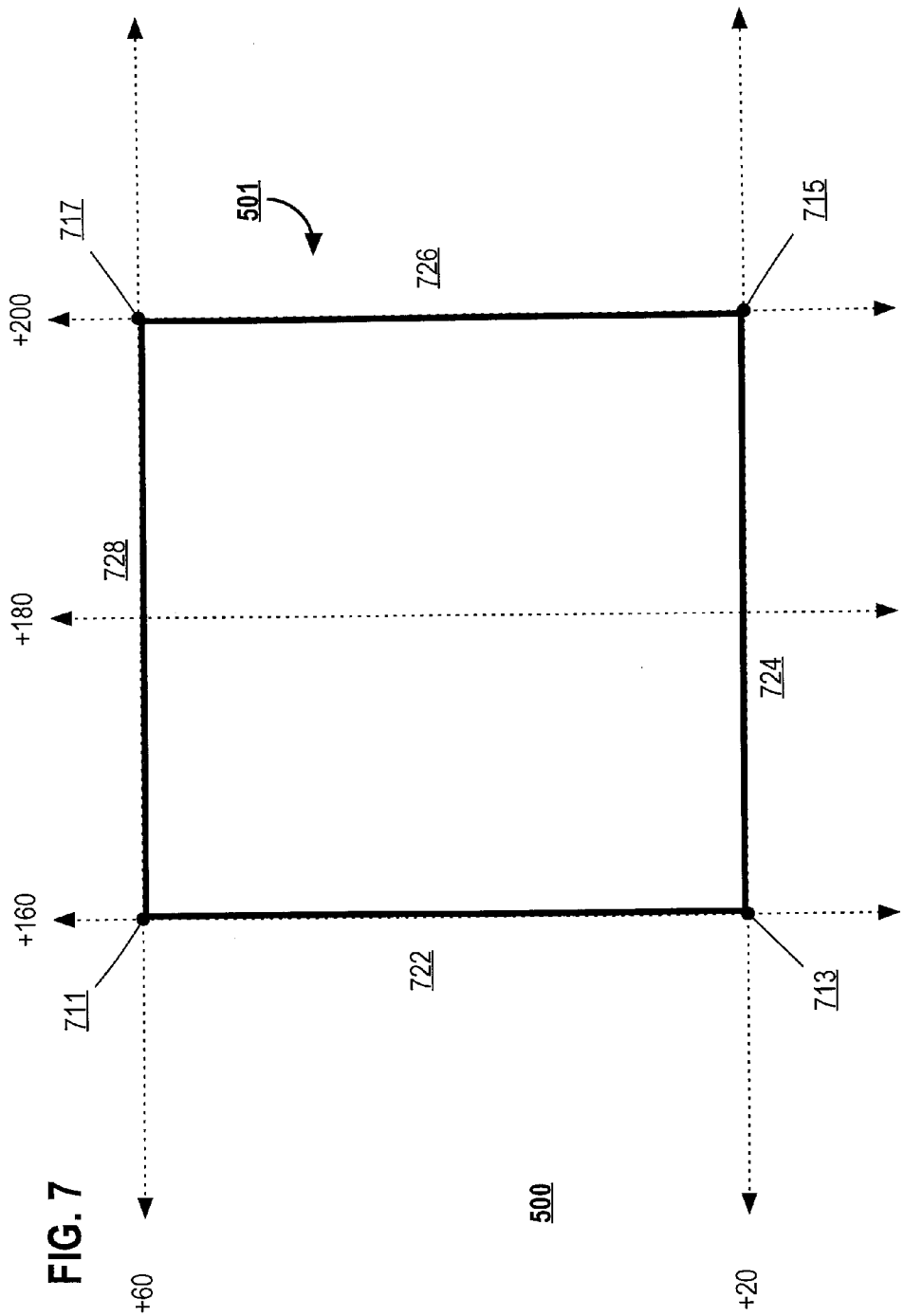
FIG. 7 is a block diagram illustrating a projected planar polygon.

Note that while the shape of segments 722, 724, 726, and 728 in FIG. 7 and the shape of the segments comprising projected planar polygon 501 in FIG. 5 appear as straight lines, the shape of the segments may be arcs when drawn on a map to accurately reflect the shortest surface path along the surface of the Earth (e.g., a great circle distance) connecting vertices of geodetic polygon 201. Thus, the shape of segments 722, 724, 726, and 728 in FIG. 7 and the shape of the segments comprising projected planar polygon 501 in FIG. 5 are not intended to be an accurate representation of how those segments would appear when accurately drawn on a map. In one embodiment, additional geographic coordinates are calculated along geodesics connecting vertices of a geodetic polygon, for example according to a great circle arc calculation, and those additional geographic coordinates are transformed into planar coordinates when projecting the geodetic polygon as a projected planar polygon. By doing so, the shape of the segments connecting vertices of the projected planar polygon may appear as arcs to reflect on the map the shortest path along the surface of the Earth connecting vertices of the geodetic polygon.

Sub-method 600 of FIG. 6 is but one non-limiting example of a method for transforming an ordered set of geographic coordinates representing the vertices of a geodetic polygon into an ordered set of planar coordinates representing the vertices of a projected planar polygon and other methods that achieve the same result may be used. Further, the steps of sub-method 600 may be performed in a different order than the order shown in FIG. 6 or some steps may be omitted entirely altogether. For example, transformation of vertices may be performed by first transforming all geographic coordinates to planar coordinates using a cylindrical projection function to first determine whether the geodetic polygon straddles a splitting meridian before any adjustments are made to the planar coordinates.

Mapping Planes

According to one embodiment, a projected space is modeled as an infinite series of horizontally arranged contiguous mapping planes. Each mapping plane has a horizontal extent along the horizontal axis of the projected space that is equal in length to the horizontal extent of a map projection of the Earth along the horizontal axis. One mapping plane serves as the origin mapping plane. In the projected space, segments of the projected planar polygon that cross the right-most or left-most vertical boundary of a mapping plane represent geodesics of the geodetic polygon that cross the splitting meridian.

As an example, projected space 500 of FIG. 5 comprises map 503 projected into projected space 500 using an equidistant cylindrical projection. Conceptually, projected space 500 comprises origin mapping plane 502 having a right-most vertical boundary at 180 on the horizontal axis and a left-most vertical boundary at −180 on the horizontal axis. The horizontal extent of origin mapping plane 502 along horizontal axis 504 is 360, equal to the horizontal extent of map 503 along horizontal axis 504. Additionally, projected space 500 conceptually comprises additional contiguous mapping planes extending positively along horizontal axis 504 between 180 and 540, between 540 and 900, and so on. Projected space 500 also conceptually comprises additional contiguous mapping planes extending negatively along horizontal axis 504 boundary −180 and −540, between −540 and −900, and so on.

Dividing a Projected Planar Polygon

Returning to FIG. 4, at step 403, the projected planar polygon calculated in step 402 is divided into a plurality of sub-figures along the vertical boundaries of the conceptual mapping planes of the projected space. For example, projected planar polygon 501 would be divided at the vertical boundary at 180 on horizontal axis 504 to create two sub-figures. The vertical boundary at 180 is the right-most boundary of origin mapping plane 502 and the left-most boundary of the next mapping plane contiguous to origin mapping plane 502 moving positively along horizontal axis 504. Dividing projected planar polygon 501 at vertical boundary 180 creates two sub-figures, a first sub-figure having ordered vertices ((180, a), (160, 60), (160, 20), (180, b)) lying in origin mapping plane 502 and a second sub-figure having ordered vertices ((180, b), (200, 20), (200, 60)), (180, a)) and lying in the mapping plane between 180 and 540 on horizontal axis 504. The y-values for the vertices of the first sub-figures having x-values along the dividing vertical are designated with variables (a) and (b) to denote that segments connecting vertices of a projected planar polygon may not be straight lines and that those y-values may correspond to a point on an arc connecting the vertices.

In one embodiment, additional geographic coordinates are calculated along geodesics connecting vertices of a geodetic polygon, for example according to a great circle arc calculation, and those additional geographic coordinates are transformed into planar coordinates when projecting the geodetic polygon as a projected planar polygon. By doing so, the shape of the segments connecting vertices of the projected planar polygon may appear as arcs to reflect on the map the shortest path along the surface of the Earth connecting vertices of the geodetic polygon.

A geodetic polygon that wraps at least once around the entire Earth will generate, in step 402, a projected planar polygon that extends along the horizontal axis of the projected space beyond both the right-most boundary and the left-most boundary of a mapping plane. In such a case, dividing the projected planar polygon along vertical boundaries of the mapping planes may generate more than two sub-figures.

Figure 8:
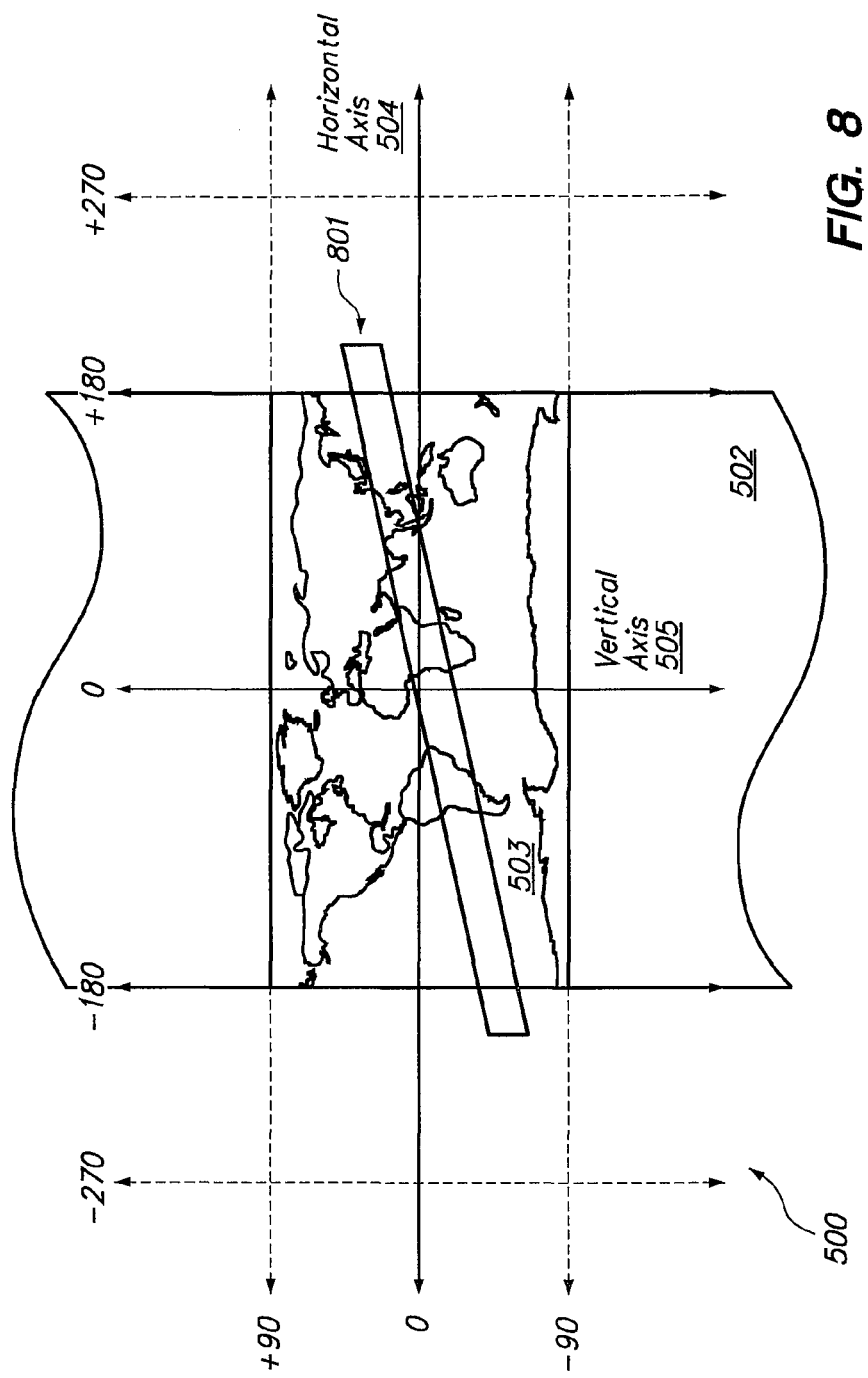
FIG. 8 is a block diagram illustrating a projected space.

For example, FIG. 8 illustrates projected planar polygon 801 in projected space 500. Projected planar polygon 801 may be represented by a set of planar coordinates produced by step 402 of FIG. 2 and sub-method 600 of FIG. 6. Projected planar polygon 801 represents a straddling geodetic polygon that wraps around the entire Earth.

At step 403, projected planar polygon would be divided along the right-most boundary of origin mapping plane 502 at 180 on horizontal axis 504 and at the left-most boundary of origin mapping plane 502 at −180 on horizontal axis 504. Such dividing would produce three sub-figures comprising projected planar polygon 801, one sub-figure would be the portion of the projected planar polygon 801 lying in the mapping plane between −540 and −180 along the horizontal axis 504, another sub-figure would be the portion of the projected planar polygon 801 lying in the origin mapping plane 502, and the third sub-figure would be the portion of projected planar polygon 801 lying in the mapping plane between 180 and 540 along the horizontal axis 504.

Shifting Sub-Figures into the Origin Mapping Plane

At step 404, the sub-figures created in step 403 that are not within the origin mapping plane are shifted along the horizontal axis of the projected space so that those sub-figures are within the origin mapping plane. The sub-figures created in step 403 already within the origin mapping plane are not shifted.

In one embodiment, the amount to shift a sub-figure along the horizontal axis is based on a multiple of the horizontal extent of the map along the horizontal axis. In one embodiment, the multiple is calculated based on the number of mapping planes that lie between the origin mapping plane and the mapping plane in which the sub-figure to be shifted resides. The amount of shift is added to or subtracted from the vertices comprising the sub-figure so that the sub-figure resides within the original mapping plane.

Figure 9:
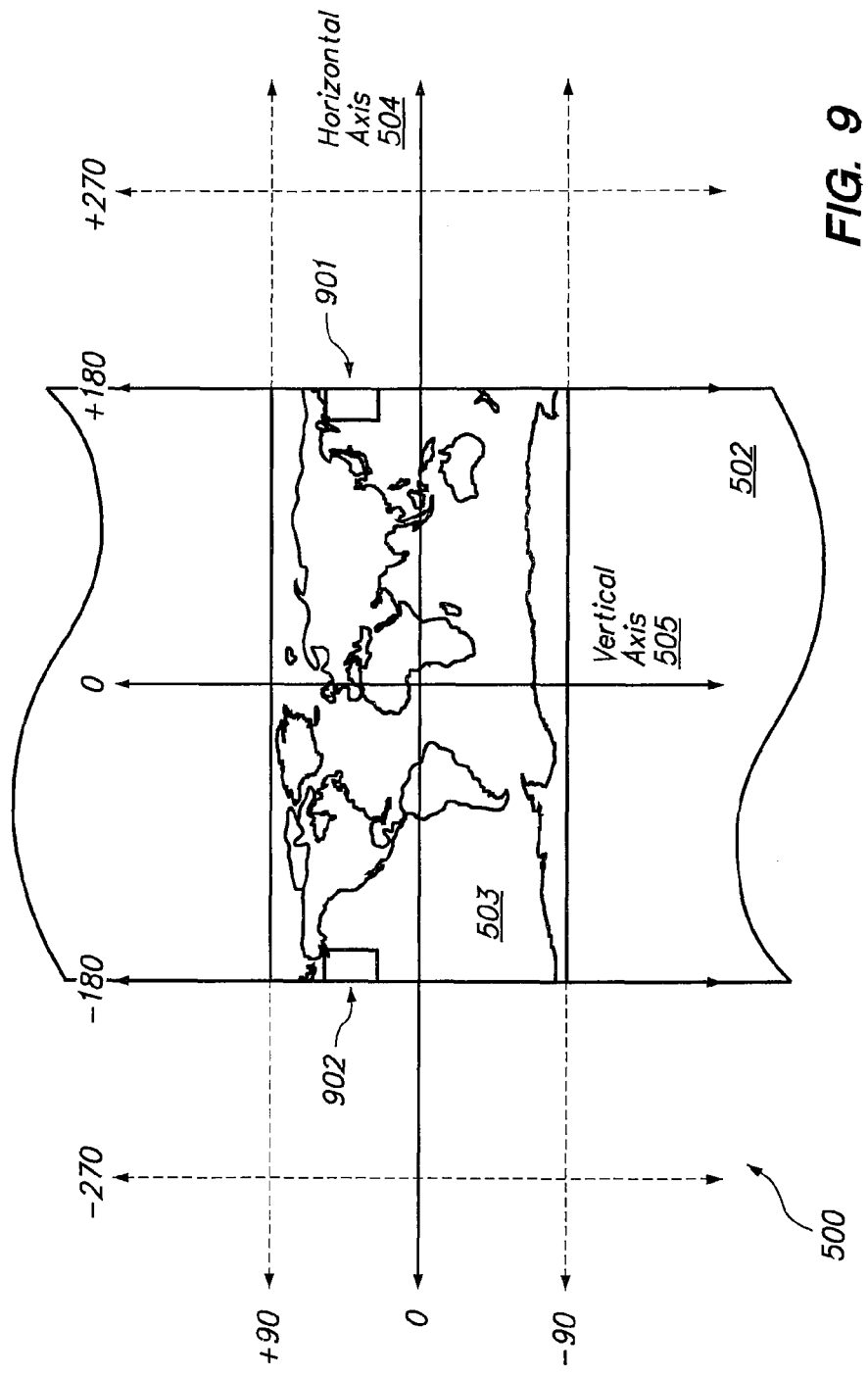
FIG. 9 is a block diagram illustrating a projected space.

As an example, projected planar polygon 501 of FIG. 5 would be divided, in step 403, at the vertical boundary at 180 on horizontal axis 504 to create two sub-figures, a first sub-figure having ordered vertices ((180, a), (160, 60), (160, 20), (180, b)) lying in origin mapping plane 502 and a second sub-figure having ordered vertices ((180, b), (200, 20), (200, 60)), (180, a)) and lying in the mapping plane between 180 and 540 on horizontal axis 504. At step 404, the first sub-figure would not be shifted because it already lies within the origin mapping plane 502. However, the second sub-figure would be shifted so that is resides within the origin mapping plane. According to one embodiment, the amount to shift the second sub-figure would be calculated based on the horizontal extent of map 503 in projected space 500 which is 360 and the number of mapping planes between origin mapping plane 503 and the mapping plane residing between 180 and 540 which is zero. Accordingly, the vertices of the second sub-figure would be shifted by 360 in the negative direction along horizontal axis to produce a shifted sub-figure having ordered vertices ((−180, b), (−160, 20), (−160, 60)), (−180, a)). FIG. 9 shows the shifted sub-figure 902 and first sub-figure 901 corresponding to straddling geodetic polygon 201 of FIG. 2.

Figure 10:
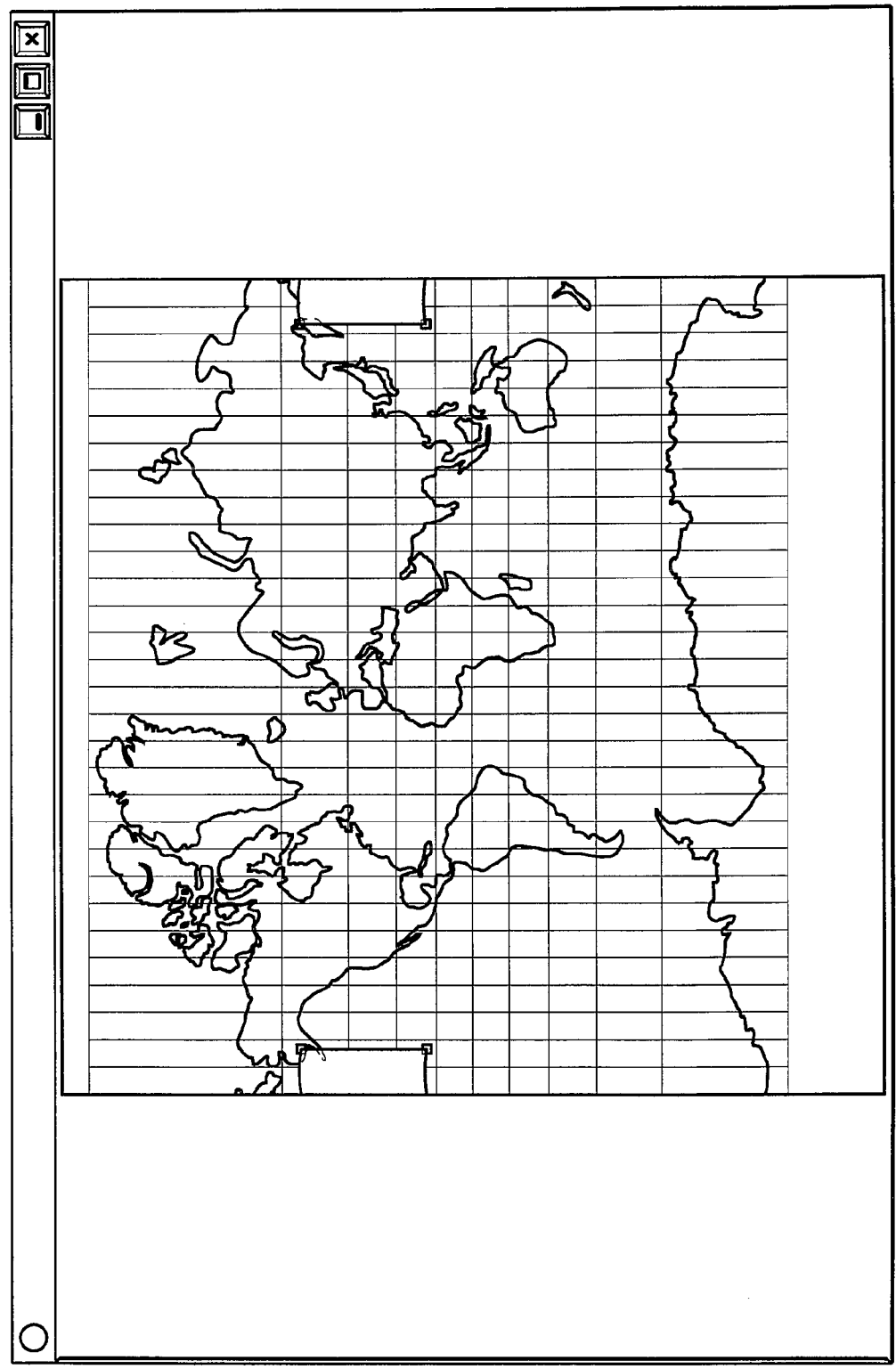
FIG. 10 is a screen shot depicting a geodetic polygon drawn on a map of the Earth.

At step 405, the map of the origin mapping plane including the sub-figures within the origin mapping plane as positioned within the origin mapping frame by steps 403 and 404 of method 400 are displayed on a display device of a computing device. For example, FIG. 10 is a screen shot of a map of the Earth shifted sub-figure 902 and first sub-figure 901 corresponding to straddling geodetic polygon 201 of FIG. 2.

Techniques for drawing on a map a geodetic polygon that straddles a splitting meridian have been described. With the techniques, a geospatial application can manage straddling polygons like other non-straddling geodetic polygons. In particular, the techniques remove the need to require a user of a geospatial application to define multiple non-straddling geodetic polygons as substitutes for a straddling polygon. Further, the techniques facilitate accurate visual representation of the perimeter and area of a straddling polygon when drawn on a map. Further, because the techniques allow a geospatial application to manage a straddling polygon as a whole, the techniques remove the need to formulate multiple geospatial queries as required in circumstances where geospatial applications require straddling polygons be split into multiple substitute geodetic polygons.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Extensions and Alternatives

In the foregoing specification, embodiments of the invention have been described with reference to numerous specific details that may vary from implementation to implementation. For example, certain embodiments have been described with respect to drawing a geodetic polygon on a map of the Earth, but other embodiments may be applied to drawing a geodetic polygon on other kinds of locations or other planetary bodies. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for drawing a geodetic polygon on a map, the method comprising:
  maintaining data that represents a geodetic polygon;
  wherein the data comprises an ordered set of geographic coordinates representing adjacent vertices along a perimeter of the geodetic polygon;
  transforming the set of geographic coordinates into a set of planar coordinates representing vertices of a planar polygon;
  wherein transforming the set of geographic coordinates into the set of planar coordinates includes proceeding through the set of geographic coordinates in a manner that represents a counter clockwise or clockwise traversal along the perimeter of the geodetic polygon until each geographic coordinate of the set of geographic coordinates is transformed to a corresponding planar coordinate;
  wherein proceeding through the set of geographic coordinates includes:
    transforming a first geographic coordinate of the set of geographic coordinates corresponding to a first vertex of the geodetic polygon to a first planar coordinate,
    transforming a second geographic coordinate of the set of geographic coordinates corresponding to a second vertex of the geodetic polygon to a second planar coordinate,
    wherein the first vertex and the second vertex are adjacent vertices according to the order of the set of geographic coordinates,
    calculating a distance along a horizontal axis of a two-dimensional plane between the first planar coordinate and the second planar coordinate, and
    determining that the geodetic polygon straddles a splitting meridian by determining that said distance is greater than one-half a horizontal extent of the map along the horizontal axis of the two-dimensional plane;
  where the geodetic polygon straddles the splitting meridian:
    dividing the planar polygon into a plurality of sub-figures;
    shifting at least one sub-figure of the plurality of sub-figures along the horizontal axis of the two-dimensional plane to produce a shifted sub-figure; and
    causing the shifted sub-figure to be displayed on the map concurrently with at least one other sub-figure of the plurality of sub-figures that was not shifted;
  wherein the method is performed by one or more computing devices.

2. The method of claim 1, wherein transforming the set of geographic coordinates into the set of planar coordinates representing the planar polygon further comprises:
  calculating a third planar coordinate based on a difference between (1) said distance along the horizontal axis and (2) the horizontal extent of the map along the horizontal axis; and
  wherein said set of planar coordinates representing said planar polygon includes the first planar coordinate and the third planar coordinate but does not include the second planar coordinate.

3. The method of claim 2, wherein the x-value of the third planar coordinate is based on the x-value of the first planar coordinate and said difference.

4. The method of claim 3, wherein the x-value of the third planar coordinate places the third planar coordinate along the horizontal axis to the right of the right-most boundary of said map.

5. The method of claim 3, wherein the x-value of the third planar coordinate places the third planar coordinate along the horizontal axis to the left of the left-most boundary of said map.

6. The method of claim 1, wherein at least one planar coordinate of said planar polygon has an x-value that places the at least one planar coordinate along the horizontal axis to the right of the right-most boundary of said map.

7. The method of claim 6, wherein at least one other planar coordinate of said planar polygon has an x-value that places the at least one other planar coordinate along the horizontal axis to the left of the left-most boundary of said map.

8. The method of claim 1, wherein splitting the planar polygon into a plurality of sub-figures comprises splitting the planar polygon along the right-most boundary of said map to form two sub-figures comprising the planar polygon.

9. The method of claim 1, wherein splitting the planar polygon into a plurality of sub-figures comprises splitting the planar polygon along the right-most boundary and the left-most boundary of said map to form three sub-figures comprising the planar polygon.

10. The method of claim 1, wherein shifting the at least one sub-figure of the plurality of sub-figures along the horizontal axis comprises:
  shifting the at least one sub-figure of the plurality of sub-figures along the horizontal axis by an amount corresponding to the horizontal extent of the map along the horizontal axis.

11. The method of claim 10, wherein the shifted sub-figure has a plurality of vertices having y-values along a vertical axis in the two-dimensional plane equal to the y-values along the vertical axis of the vertices of the at least one sub-figure, and wherein the x-values along the horizontal axis of the vertices of the shifted sub-figure are offset from the x-values along the horizontal axis of the vertices of the at least one sub-figure by an amount equal to the horizontal extent of the map along the horizontal axis.

12. The method of claim 1, wherein the geographic coordinates are maintained in terms of latitude and longitude.

13. The method of claim 1, wherein the set of geographic coordinates are transformed into the set of planar coordinates using a cylindrical projection mapping function selected from the group consisting of a Mercator projection mapping function, a cylindrical equidistant projection mapping function, and a Miller cylindrical projection mapping function.

14. A non-transitory computer-readable medium storing instructions for drawing a geodetic polygon on a map, the instructions, when executed by one or more computing devices, cause the one or more computing devices to perform a method comprising:
  maintaining data that represents a geodetic polygon;

wherein the data comprises an ordered set of geographic coordinates representing adjacent vertices along a perimeter of the geodetic polygon;

transforming the set of geographic coordinates into a set of planar coordinates representing vertices of a planar polygon;

wherein transforming the set of geographic coordinates into the set of planar coordinates includes proceeding through the set of geographic coordinates in a manner that represents a counter clockwise or clockwise traversal along the perimeter of the geodetic polygon until each geographic coordinate of the set of geographic coordinates is transformed to a corresponding planar coordinate;

wherein proceeding through the set of geographic coordinates includes:

transforming a first geographic coordinate of the set of geographic coordinates corresponding to a first vertex of the geodetic polygon to a first planar coordinate, transforming a second geographic coordinate of the set of geographic coordinates corresponding to a second vertex of the geodetic polygon to a second planar coordinate, wherein the first vertex and the second vertex are adjacent vertices according to the order of the set of geographic coordinates, calculating a distance along a horizontal axis of a two-dimensional plane between the first planar coordinate and the second planar coordinate, and determining that the geodetic polygon straddles a splitting meridian by determining that said distance is greater than one-half a horizontal extent of the map along the horizontal axis of the two-dimensional plane;

where the geodetic polygon straddles the splitting meridian:

dividing the planar polygon into a plurality of sub-figures;

shifting at least one sub-figure of the plurality of sub-figures along the horizontal axis of the two-dimensional plane to produce a shifted sub-figure; and causing the shifted sub-figure to be displayed on the map concurrently with at least one other sub-figure of the plurality of sub-figures that was not shifted.

15. The medium of claim 14, wherein transforming the set of geographic coordinates into the set of planar coordinates representing the planar polygon further comprises:

calculating a third planar coordinate based on a difference between (1) said distance along the horizontal axis and (2) the horizontal extent of the map along the horizontal axis; and wherein said set of planar coordinates representing said planar polygon includes the first planar coordinate and the third planar coordinate but does not include the second planar coordinate.

16. The medium of claim 15, wherein the x-value of the third planar coordinate is based on the x-value of the first planar coordinate and said difference.

17. The medium of claim 16, wherein the x-value of the third planar coordinate places the third planar coordinate along the horizontal axis to the right of the right-most boundary of said map.

18. The medium of claim 16, wherein the x-value of the third planar coordinate places the third planar coordinate along the horizontal axis to the left of the left-most boundary of said map.

19. The medium of claim 14, wherein at least one planar coordinate of said planar polygon has an x-value that places the at least one planar coordinate along the horizontal axis to the right of the right-most boundary of said map.

20. The medium of claim 19, wherein at least one other planar coordinate of said planar polygon has an x-value that places the at least one other planar coordinate along the horizontal axis to the left of the left-most boundary of said map.

21. The medium of claim 14, wherein splitting the planar polygon into a plurality of sub-figures comprises splitting the planar polygon along the right-most boundary of said map to form two sub-figures comprising the planar polygon.

22. The medium of claim 14, wherein splitting the planar polygon into a plurality of sub-figures comprises splitting the planar polygon along the right-most boundary and the left-most boundary of said map to form three sub-figures comprising the planar polygon.

23. The medium of claim 14, wherein shifting the at least one sub-figure of the plurality of sub-figures along the horizontal axis comprises:

shifting the at least one sub-figure of the plurality of sub-figures along the horizontal axis by an amount corresponding to the horizontal extent of the map along the horizontal axis.

24. The medium of claim 23, wherein the shifted sub-figure has a plurality of vertices having y-values along a vertical axis in the two-dimensional plane equal to the y-values along the vertical axis of the vertices of the at least one sub-figure, and wherein the x-values along the horizontal axis of the vertices of the shifted sub-figure are offset from the x-values along the horizontal axis of the vertices of the at least one sub-figure by an amount equal to the horizontal extent of the map along the horizontal axis.

25. The medium of claim 14, wherein the geographic coordinates are maintained in terms of latitude and longitude.

26. The medium of claim 14, wherein the set of geographic coordinates are transformed into the set of planar coordinates using a cylindrical projection mapping function selected from the group consisting of a Mercator projection mapping function, a cylindrical equidistant projection mapping function, and a Miller cylindrical projection mapping function.

27. A geodetic polygon drawing computer system comprising:

memory configured to store data that represents a geodetic polygon;

wherein the data comprises an set of geographic coordinates representing adjacent vertices along a perimeter of the geodetic polygon;

transformation logic coupled to the memory and configured to transform a state of the memory by transforming the set of geographic coordinates into a set of planar coordinates representing vertices of a planar polygon;

wherein the transformation logic includes logic configured to transform a state of the memory by:

proceeding through the set of geographic coordinates in a manner that represents a counter clockwise or clockwise traversal along the perimeter of the geodetic polygon until each geographic coordinate of the set of geographic coordinates is transformed to a corresponding planar coordinate, transforming a first geographic coordinate of the set of geographic coordinates corresponding to a first vertex of the geodetic polygon to a first planar coordinate, transforming a second geographic coordinate of the set of geographic coordinates corresponding to a second vertex of the geodetic polygon to a second planar coordinate, wherein the first vertex and the second vertex are adjacent vertices according to the order of the set of geographic coordinates, calculating a distance along a horizontal axis of a two-dimensional plane between the first planar coordinate and the second planar coordinate, and determining that the geodetic polygon straddles a splitting meridian by determining that said distance is greater than one-half a horizontal extent of a map along the horizontal axis of the two-dimensional plane;

planar polygon splitting logic coupled to the transformation logic and configured to further transform the state of the memory by dividing the planar polygon into a plurality of sub-figures where the geodetic polygon straddles the splitting meridian;

shifting logic coupled to the planar polygon splitting logic and configured to further transform the state of the memory by shifting at least one sub-figure of the plurality of sub-figures along the horizontal axis of the two-dimensional plane to produce a shifted sub-figure where the geodetic polygon straddles the splitting meridian; and display driving logic configured to cause displaying, on a computer display unit, the shifted sub-figure on the map concurrently with at least one other sub-figure of the plurality of sub-figures that was not shifted where the geodetic polygon straddles the splitting meridian.

* * * * *